United States Patent [19]
Morzano et al.

[11] Patent Number: 5,805,931
[45] Date of Patent: Sep. 8, 1998

[54] PROGRAMMABLE BANDWIDTH I/O PORT AND A COMMUNICATION INTERFACE USING THE SAME PORT HAVING A PLURALITY OF SERIAL ACCESS MEMORIES CAPABLE OF BEING CONFIGURED FOR A VARIETY OF PROTOCOLS

[75] Inventors: Christopher K. Morzano, Boise; Charles L. Ingalls, Meridian, both of Id.

[73] Assignee: Micron Technology, Inc., Boise, Id.

[21] Appl. No.: 598,896

[22] Filed: Feb. 9, 1996

[51] Int. Cl.[6] .................................................. G06F 13/00
[52] U.S. Cl. .................... 395/884; 395/831; 395/384; 395/898; 395/883; 341/89; 341/88
[58] Field of Search ..................... 341/89, 88; 345/114; 348/718; 365/230.05; 380/3; 395/384, 800.14, 883, 856, 889, 831, 884

[56] References Cited

U.S. PATENT DOCUMENTS

| | | |
|---|---|---|
| 4,603,320 | 7/1986 | Farago ........................................ 341/89 |
| 4,638,451 | 1/1987 | Hester et al. ............................. 395/889 |
| 4,972,470 | 11/1990 | Farago ........................................ 380/3 |
| 5,233,564 | 8/1993 | Ohshima et al. .................. 365/230.05 |
| 5,289,580 | 2/1994 | Latif et al. ................................ 395/883 |
| 5,313,431 | 5/1994 | Uruma et al. ....................... 365/230.05 |
| 5,315,388 | 5/1994 | Shen et al. ................................ 348/718 |
| 5,367,649 | 11/1994 | Cedar ........................................ 395/384 |
| 5,416,909 | 5/1995 | Long et al. .............................. 395/856 |
| 5,532,714 | 7/1996 | Knapp et al. ............................ 345/114 |
| 5,555,429 | 9/1996 | Parkinson et al. .................. 395/800.14 |
| 5,657,289 | 8/1997 | Hush et al. ......................... 365/230.05 |

*Primary Examiner*—Thomas C. Lee
*Assistant Examiner*—Po. C. Huang
*Attorney, Agent, or Firm*—Seed and Berry LLP

[57] ABSTRACT

A programmable bandwidth I/O port using a DRAM connected to a plurality of serial access memories. Data is synchronously transferred between the DRAM and the serial access memories and is asynchronously transferred between the serial access memories and a plurality of single or multiple bit I/O ports. The bus widths of the I/O ports may be easily programmed to provide a wide variety of I/O port configurations.

7 Claims, 10 Drawing Sheets

Fig. 2A (8X8) CODE → 1,1

Fig. 2B (4X4) CODE → 5,5

Fig. 2C (2X2) CODE → 9,9

Fig. 2D (1X1) CODE → 10,10

Fig. 2E (8X4) CODE → 1,5

Fig. 2F (8X2) CODE → 1,9

Fig. 2G (8X1) CODE → 1,10

Fig. 2H CODE → 1,6

Fig. 2I (4X8) CODE → 5,1

Fig. 2J (2X8) CODE → 9,1

Fig. 2K (1X8) CODE → 10,1

Fig. 2L CODE → 6,1

Fig. 2M CODE → 6,6

Fig. 2N CODE → 7,7

Fig. 2O CODE → 4,2

Fig. 2P (2X1) CODE → 9,10

PROGRAMMABLE BANDWIDTH I/O PORT AND A COMMUNICATION INTERFACE USING THE SAME PORT HAVING A PLURALITY OF SERIAL ACCESS MEMORIES CAPABLE OF BEING CONFIGURED FOR A VARIETY OF PROTOCOLS

TECHNICAL FIELD

This invention relates to input/output ("I/O") ports, and more particularly, to an I/O data port having a programmable bandwidth.

BACKGROUND OF THE INVENTION

I/O ports are commonly used to interconnect a wide variety of digital devices, such as personal computers, facsimiles, data terminals, etc. The "bandwidth" of an I/O port is a measure of the rate in bits per second at which digital information may be transferred through the port. I/O ports are commonly a single bit in width so that the bandwidth of the port is entirely a function of the rate that successive bits are applied to the port. However, I/O ports may also be multiple bits in width, thereby increasing the bandwidth of the port in proportion to its width (i.e., number of bits). An I/O port having a width of two bits simultaneously transfers two bits at a time, with successive 2-bit pairs following in sequence. For an I/O port having a width of four bits, sequential sets of four bits are simultaneously applied to four respective lines of the port.

In many data communication systems, a digital device having an I/O port of a first width (e.g., a network) must communicate with the I/O ports of several digital devices having varying width. For example, an I/O port for a network may have a width of 16 bits, and it may be necessary for the network to communicate with a personal computer having an I/O port with a width of eight bits, a personal computer having an I/O port with a width of four bits, a lighting control system having an I/O port with a width of two bits, and two alarm systems each having a single bit I/O port.

While various communication interfaces have been devised to connect multiple I/O ports of varying width to each other, such devices lack flexibility to make them universally usable. Thus, different communication interfaces must be obtained to interconnect each specific combination of I/O ports to each other. There is therefore a need for a configurable I/O port that can be easily programmed to interconnect I/O ports of varying number in bandwidth. A network 10 is shown in FIG. 1 interconnecting two communications interfaces 12, 14 through a communication node 16. The communications interface 12 communicates with the node 16 through a 16-bit bus while the second communications interface 14 communicates with the node 16 through an 8-bit bus. The first communications interface 12 provides communications between the 16-bit bus from the node 16 and four 4-bit buses each of which is connected to a personal computer 20–26. The second communications interface 14 provides communication between the 8-bit bus and a first personal computer 30 through an 8-bit bus, a second personal computer 32 through a 4-bit bus, and two personal computers 34, 36 through respective 2-bit buses. Thus, in the example shown in FIG. 1, it would be necessary for the first communications interface 12 to be specially configured to interface between one 16-bit I/O port and four 4-bit I/O ports. In contrast, it would be necessary for the second communications interface 14 to be specially configured to interface a single 8-bit I/O port with an 8-bit I/O port, a 4-bit I/O port, and two 2-bit I/O ports.

Although FIG. 1 shows two configuration examples for communications interfaces, a wide variety of communications interfaces must be provided to satisfy a wide variety of configuration needs. For example, with reference to FIG. 2, the communications interfaces of FIGS. 2A–P interface I/O ports to each other according to the following table.

TABLE 1

| Figure | Input Ports | Output Ports |
|---|---|---|
| A | 8 four bit | 8 four bit |
| B | 4 eight bit | 4 eight bit |
| C | 2 16 bit | 2 16 bit |
| D | 1 32 bit | 1 32 bit |
| E | 8 four bit | 4 eight bit |
| F | 8 four bit | 2 16 bit |
| G | 8 four bit | 1 32 bit |
| H | 8 four bit | 1 16 bit |
|   |   | 4 four bit |
| I | 4 eight bit | 8 four bit |
| J | 2 16 bit | 8 four bit |
| K | 1 32 bit | 8 four bit |
| L | 1 16 bit | 8 four bit |
|   | 4 four bit |   |
| M | 1 16 bit | 1 16 bit |
|   | 4 four bit | 4 four bit |
| N | 1 16 bit | 1 16 bit |
|   | 1 eight bit | 1 eight bit |
|   | 2 four bit | 2 four bit |
| O | 3 eight bit | 1 eight bit |
|   | 2 four bit | 6 four bit |
| P | 2 16 bit | 1 32 bit |

It will be readily apparent that FIGS. 2A–P show only some of the combinations that can exist in interfacing a first set of 32 bits arranged in various bus configurations with a second set of 32 bits arranged in various bus configurations. The immense variety of communications interfaces that must be available to satisfy all of these configuration needs greatly increases the expense and inconvenience of using communications interfaces.

SUMMARY OF THE INVENTION

The inventive communications interface has a plurality of I/O ports, each of which has a programmable bandwidth. The communications interface includes a random access memory having a data bus containing a predetermined number of bits, and a plurality of serial access memories. Each of the serial access memories has a plurality of memory cells that are connected to a respective bit of the random access memory data bus. Data is transferred between the random access memory and the memory cells of a serial access memory responsive to respective transfer signals. The transfer signals are provided by a random access memory transfer circuit as a function of the programming of the I/O port. The memory cells in groups of one or more of the serial access memories are selectively connected to respective I/O ports responsive to corresponding sequence signals. The sequence signals are provided by a sequencer so that data is transferred between the I/O ports and selected memory cells of selected serial access memories as a function of the programming.

The I/O ports may be programmed to have a variety of bandwidths. Basically, N serial access memories are used to provide an I/O port having an N-bit bandwidth. The random access memory transfer circuit transfers groups of M sequential bits of the random access memory data bus between corresponding memory cells of the N serial access memories. The sequencer then causing the corresponding memory cells of the N serial access memories to be simultaneously connected to their respective I/O port lines.

Each of the serial access memories includes for each memory cell a data latch, and first and second pass gates. The data latch has first and second ports each connected to the other output-to-input. The first pass gate is connected between the data latch and a corresponding bit of the random access memory data bus. The first pass gate closes responsive to the transfer signal for the serial access memory to allow communication between the data latch and its corresponding random access memory data bus bit. The second pass gate is connected between the data latch for the memory cell and an I/O port line for the serial access memory. The second pass gate closes responsive to a respective sequence signal to allow communication between the data latch and the I/O port line. The random access memory transfer circuit preferably includes a transfer enable signal generator, a program signal generator, and a logic circuit.

The transfer enable signal generator is included in the random access memory, and it generates appropriately timed transfer enable signals corresponding to each of the serial access memories. The program signal generator provides programming signals designating each serial access memory to be used with a respective I/O port as well as the bandwidth of such I/O port. The logic circuit generates the transfer signals as a predetermined function of the transfer enable signals and the programming signals. The transfer signals transfer data between the random access memory and at least one serial access memory when a transfer enable signal corresponding to the serial access memory is generated and a programming signal corresponding to an I/O port connected to the serial access memory is generated.

The sequencer preferably includes a counter circuit and a decoder for each of the serial access memories. The counter circuits receive the programming signals and generate a binary output incrementing in a pattern corresponding to the order in which the memory cells of the serial access memory are to communicate with the I/O port. The increment pattern is thus designated by the programming signals The decoder is a binary decoder having a plurality of outputs corresponding in number to the memory cells of the serial access memory. The decoder receives the binary output of the counter circuit and generating at its output the sequence signals.

BRIEF DESCRIPTION OF THE DRAWINGS

FIGS. 2A–P are block diagrams showing various examples of I/O port configurations that may be implemented with prior art communications interfaces.

DETAILED DESCRIPTION OF THE INVENTION

Figure 1:
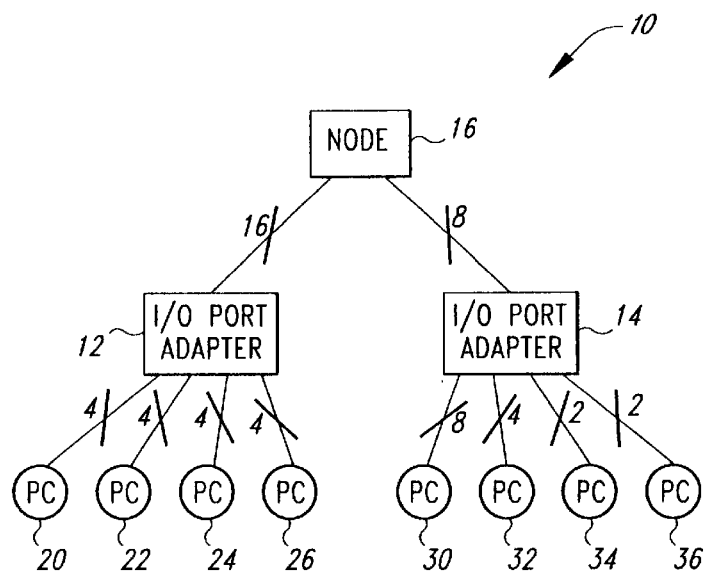
FIG. 1 is a block diagram of a prior art network showing a plurality of digital devices communicating with each other through respective communications interfaces interconnected to each other through a communications node.
Figure 3:
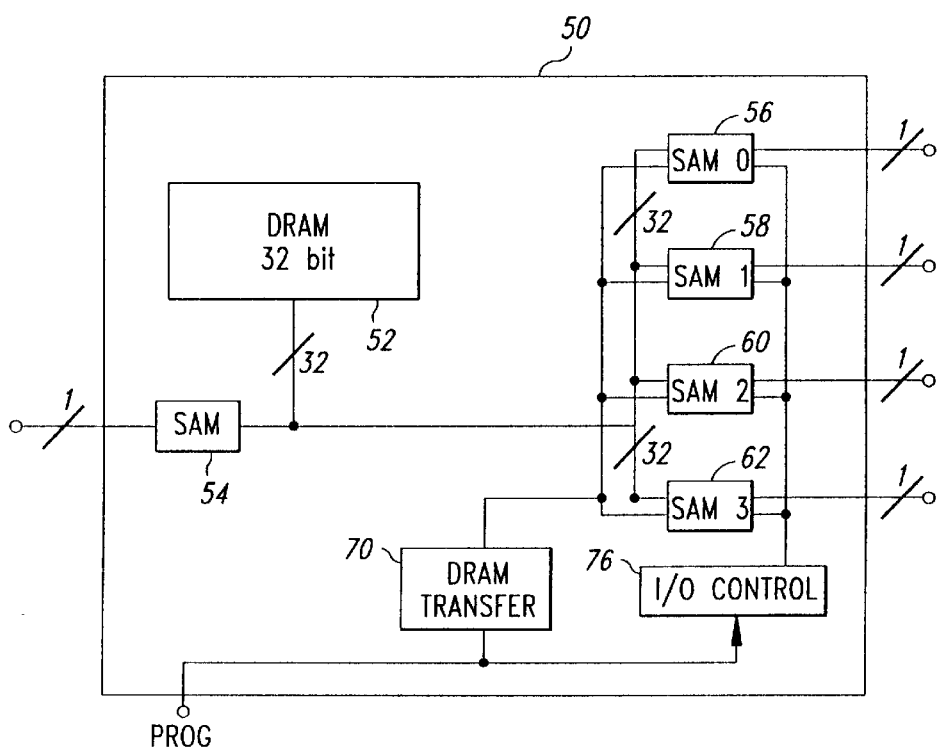
FIG. 3 is a block diagram showing a preferred embodiment of the inventive programmable bandwidth I/O port.

A preferred embodiment of a programmable communications interface 50 capable of providing a plurality of I/O ports in various configurations is illustrated in FIG. 3. The communications interface 50 includes a conventional dynamic random access memory ("DRAM") 52 having a 32-bit data bus. All 32 bits of the data bus are connected to a first serial access memory ("SAM") forming an I/O port and to four SAMs 56–62 used to form four additional I/O ports, respectively. Although each of the SAMs 54–62 are coupled to all 32 bits of the data bus, the SAMs 54–62 are selectively enabled in a conventional manner so that they transfer data to or from only selected bits of the data bus.

The transfer of data between the DRAM 52 and the SAMs 54–62 are controlled by a DRAM transfer controller 70 which can operate in several modes as determined by programming data PROG. The DRAM transfer controller 70 then receives standard signals from the DRAM 52 and applies appropriate signals to the SAMs 54–62 to cause transfer of data between the SAMs 54–62 at the appropriate times. The structure and operation of the DRAM transfer circuit 70 is described in greater detail below.

The programming data PROG also controls the operation of an I/O port controller 76. The I/O port controller 76 transfers data between the SAMs 54–62 and their I/O buses with a bandwidth of the SAMs collectively designated by the programming data PROG. The structure and operation of the I/O port controller 76 is also described in greater detail below.

Figure 4:
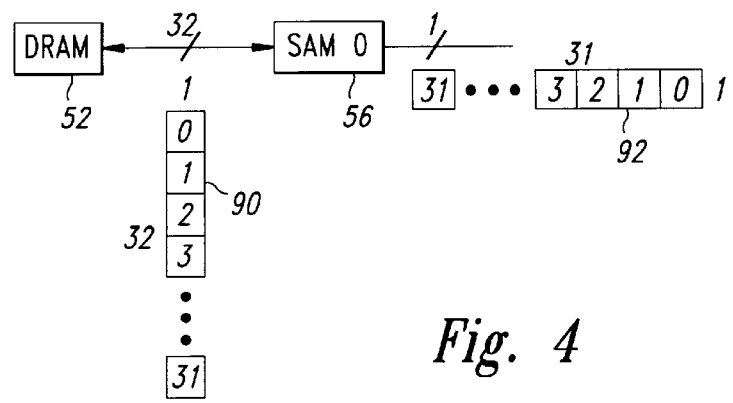
FIG. 4 is a block diagram showing a portion of the programmable I/O port of FIG. 3 programmed in a single bit mode.
Figure 5:
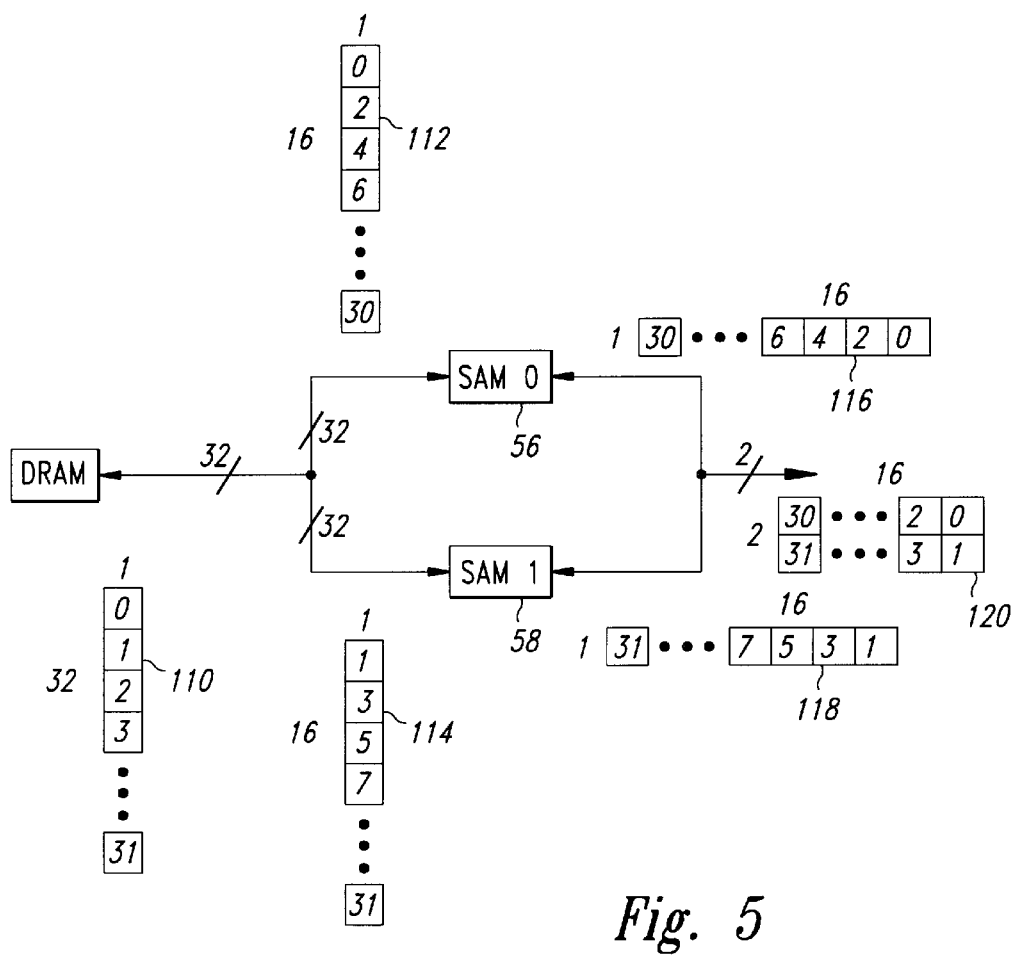
FIG. 5 is a block diagram of a portion of the I/O port of FIG. 3 programmed in a 2-bit mode.
Figure 6:
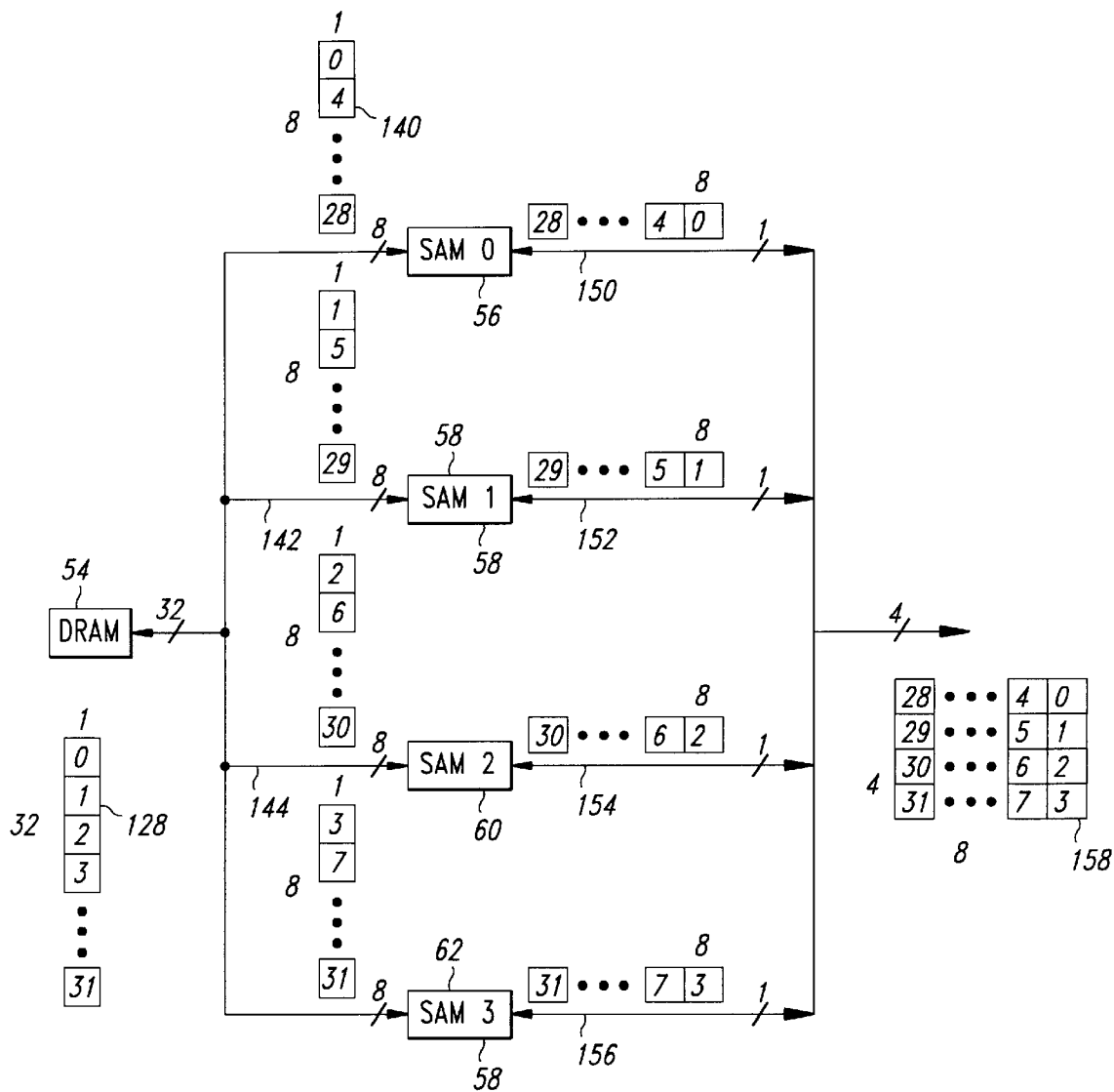
FIG. 6 is a block diagram of a portion of the I/O port of FIG. 3 programmed to operate in a 4-bit mode.

The various operating modes of the SAMs 56–62 are illustrated in FIGS. 4–6. With reference to FIG. 4, in a "by one" mode, data is transferred between the SAM 56 and the DRAM 52 on a 32-bit bus, as illustrated schematically at 90. The SAM 56 then serially applies the 32 bits to a single bit I/O bus, as illustrated schematically at 92. Thus, in the "by one" mode, a single bit I/O port is provided by SAM 56. SAMs 58–62 can be clocked independently.

With reference to FIG. 5, in a "by two" mode, data is transferred between two SAMs 56, 58 and the DRAM 52 on a 32-bit bus. As shown at 110, 32 bits are passed to or from the DRAM 52, and, as shown at 112, 114, the 16 even bits are passed to or from the SAM 56 and the 16 odd bits are passed to or from the SAM 58. The SAMs 56, 58 each apply a 16-bit serial word to a single bus I/O port as illustrated at 116, 118. Thus, two single bit I/O ports are combined to provide a single 2-bit wide I/O port. As a result, as illustrated at 120, data is passed to or from the I/O port in sixteen 2-bit pairs; therefore the data rate is doubled at the same clock frequency as compared to the single bit I/O port. SAMs 60 and 62 can also be operated together in a "by two" mode or they can be operated independently in a "by one" mode.

Finally, in the "by four" mode illustrated in FIG. 6, data is transferred between the DRAM 54 and four SAMs 56–62 on a 32-bit bus, as illustrated at 128. 8 bits of data are passed to or from each of the SAMs 56–62, with the bits passed to or from each SAM 56–62 interleaved with the bits passed to or from the other SAM 56–62. Thus, data bits 0, 4, 8 . . . 28 are passed to or from the SAM0 56, data bits 1, 5, 9 . . . 29 are passed to or from the SAM1 58, data bits 2, 6, 10 . . . 30 are passed to or from the SAM2 60, and data bits 3, 7, 11 . . . 31 are passed to or from the SAM3 62, all of which is illustrated at 140–146, respectively. Each of the SAMs 56–62 has a single bit I/O port which are combined to provide a 4-bit I/O port. Thus, as illustrated at 150–156, data is passed to or from each of the SAMs 56–62 in 8 parallel bits which are combined to provide a 4-bit I/O port through which eight 4-bit words are transferred serially, as illustrated at 158.

Figure 7:
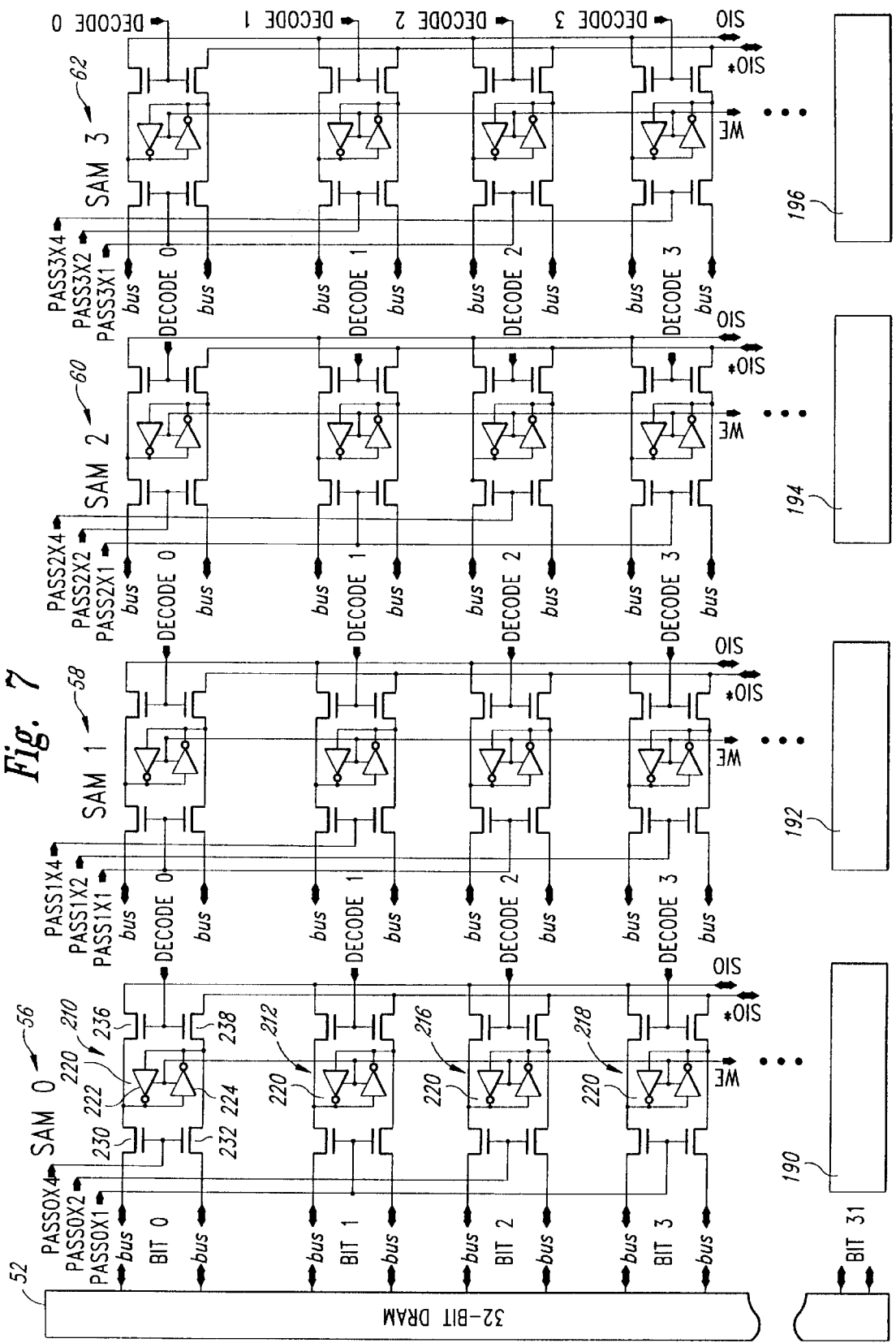
FIG. 7 is a block diagram, logic diagram and schematic showing a portion of the I/O port of FIG. 3 in greater detail.
Figure 8:
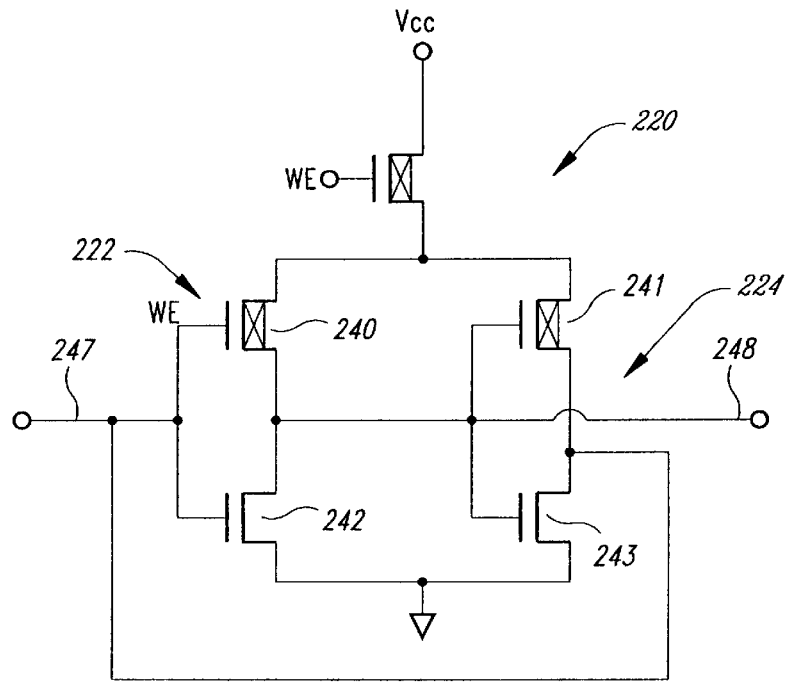
FIG. 8 is a schematic of a SAM memory cell used in the I/O port embodiment of FIG. 7.

An illustrative embodiment of the SAMs 56–62 is illustrated in FIG. 7. Also shown in FIG. 7 are four bits of the DRAM 52 which are connected to the SAMs 56–62. Each of the SAMs 56–62 is substantially identical to the others. Thus, a detailed explanation of only SAM 56 will be provided. The SAM 56 includes 32 memory access cells 210–218, each of which handles the transfer of a bit of data to or from a corresponding bit of the DRAM 52. Although each SAM 56–62 is shown in FIG. 7 as having only four serial access cells 210–218, in practice, 28 additional serial access cells 190–196 would be used to connect to the remaining 28 bits of the 32-bit DRAM 52. However, these additional serial access cells 190–196 have been omitted for purposes of brevity. Each of the memory cells 190, 210–218, include a latch 220 consisting of a pair of inverters 222, 224, with the output of the inverter 222 connected to the input of the inverter 224, and the output of the inverter 224 connected to the input of the inverter 222. The inverters 222, 224 receive a write enable signal "WE" as explained in greater detail below to cause data applied to an input of the inverters 222, 224 to be latched whenever the write enable WE signal goes high. A schematic of the latch 220 is illustrated in FIG. 8 and explained below. With continued reference to FIG. 7, complementary inputs and outputs of the latch 220 are applied to complementary data bit lines of the DRAM 52 through respective transfer gates 230, 232 which may be, for example, NMOS transistors. Similarly, complementary inputs and outputs of the latch 220 are applied to complementary I/O port lines through respective transfer gates 236, 238 which may also be NMOS transistors.

As illustrated in FIG. 7, the transfer gates 230, 232 between the DRAM 52 and the latch 220 are controlled by pass signals PASS0X1, PASS0X2, and PASS0X4 which are asserted in various combinations depending upon whether the SAM 56 is programmed in a "by one," a "by two" or a "by four" transfer mode. The origination of these signals is explained in detail below. When PASS0X1 goes high and WE high, the latches 220 of the memory cells 212, 218 are set according to data bus bit 1 and bit 3, respectively, of the DRAM 52. When PASS0X2 goes high and WE high, the latch 220 of the memory cell 216 is set according to the data bit 2 of the DRAM 52. Finally, when PASS0X4 goes high and WE high, the latch 220 of the memory cell 210 is set according to the data bit 0 of the DRAM 52. The signal connections to the SAM 60 are identical to the connections to the SAM 56 except that the latch 220 of the serial memory cell 210 is set according to data bit 0 of the DRAM 52 when PASS2X2 goes high and WE high, and the latch 220 of the memory cell 216 is set according to data bit 2 of the DRAM 52 when PASS2X4 goes high and WE high. The "pass signals" are applied to the remaining serial access cells 190 in a similar manner that will be apparent to one skilled in the art.

The "pass signals" are applied to the SAMs 58, 62 in a somewhat different manner. The PASS1X1 signal controls the transfer between the memory cell 210, 216 and data bits 0 and 2, respectively, of the DRAM 52. The PASS1X2 signal controls the transfer of data between data bit 3 of the DRAM 52 and the memory cell 218 of the SAM 58, and between data bit 1 of the DRAM 52 and the memory cell 212 of the SAM 62. Finally, the PASS1X4 signal controls the transfer of data between data bit 1 of the DRAM 52 and the memory cell 212 of the SAM 58 and between data bit 3 of the DRAM 52 and memory cell 218 of the SAM 62.

When either of the transfer gates formed by transistors 230, 232 or 236, 238 are driven by a logic "1" input, a logic "0" applied to the input line or its complement passes through the transistor 230, 232 or 236, 238. The logic "0" is latched into the latch 220 so that the logic "0" line remains high after the transistor 230, 232 or 236, 238 has opened. At the same time, the latch 220 applies a logic "1" signal to the complement of the line to which a logic "0" had been applied.

In operation, the PASS0X1–PASS3X4 signals are generated depending upon the operating mode programmed into the SAM 56–62. In a "by four" operating mode, the PASSNX4 signal for each SAM 56–62 (where N equals 0, 1 . . . 3) are simultaneously driven high, thereby setting the latch 220 in the memory cell 210 and every fourth cell 190 of SAM 56, according to bit 0 and every fourth cell of the DRAM 52, setting the latch 220 in the memory cell 212 and every fourth cell 192 of the SAM 58 according to bit 1 and every fourth cell of the DRAM 52, setting the latch 220 in the memory cell 216 and every fourth cell 194 of the SAM 60 according to bit 2 and every fourth cell of the DRAM 52, and setting the latch 220 in the memory cell 218 and every fourth cell 196 of the SAM 62 according to bit 3 and every fourth cell of the DRAM 52. Thus, in the "by four" mode, four bits are shifted between the DRAM 52 and respective memory cells of all four SAMs 56–62. The decode signals decode 0 for memory cell 210 of SAM 56, 1 for memory cell 212 of SAM 58, 2 for memory cell 216 of SAM 60, and 3 for memory cell 218 of SAM 62 are then simultaneously driven low to simultaneously drive four I/O port lines, SD0–SD3 and their compliments. The four I/O port lines SD0–SD3 and their compliments are then subsequently driven by the other cells 190–196 in seven additional groups of four. Thus, in the "by four" mode, 32 bits of data are simultaneously transferred from the DRAM 52 to the SAMs 56–62, and shifted out of four SAMs 56–62 in eight clock cycles on four I/O port lines. Alternatively, eight 4-bit groups of data are transferred from the four I/O port lines into respective memory cells of the SAMs 56–62, and transferred from the SAMs 56–62 to the DRAM 52 in one 32-bit word.

In a "by two" transfer mode, only two of the SAMs 56 and 58 or 60 and 62 are used. In the "by two" mode, the PASSNX2 and PASSNX4 (where N equals 0, 1 or 2, 3) are driven high, thereby connecting bits 0 and 2 of the DRAM 52 to memory cells 210 and 216 of SAM 56 or 60. At the same time, bits 1 and 3 the DRAM 52 are connected to memory cells 212 and 218 of SAM 58 or 62. Alternatively, bits 5–31 of the DRAM 52 are also transferred to the memory cells 190, 192 of the SAMs 56, 58, respectively, or to memory cells 194, 196 of the SAMs 60, 62, respectively. Decode 0 and 1 are driven high at the same time to connect the memory cell 210 of SAM 56 or 60 and memory cell 212 of SAM 58 or 62 to their respective I/O port lines. Decode 2 and 3 are then simultaneously driven low to connect memory cell 216 of SAM 56 or 60 and memory cell 218 of SAM 58 or 62 to their respective I/O port lines. The I/O port lines are subsequently driven by the other memory cells 190–196 in 14 additional groups of two. Thus, in the "by two" mode, 32 bits of data are simultaneously transferred from the DRAM 52 to the SAMs 56, 58, and transferred from the SAMs 56, 58 in two serial bits on two I/O port lines. Conversely, data is transferred to the SAMs 56, 58 in two serial bits on two I/O port lines, and simultaneously transferred from the SAMs 56, 58 to the DRAM 52 in one 32-bit word.

In a "by one" mode, all of the lines PASSNX1, PASSNX2, PASSNX4 (where N equals 0, 1, 2 or 3) are driven high at the same time, thereby setting the respective latches 220 in all of the memory cells of the same SAMs 56–62 according to 32 data bus bits of the DRAM 52. The memory cells are then sequentially connected to their respective I/O port lines as its respective decode 0–31 are sequentially driven high. Thus, any of the SAMs 56–62 can operate in the "by one" mode to allow 32 bits to be transferred from the DRAM 52 in parallel and applied to a single I/O port line serially. Alternatively, any of the serial access memories 200 can receive 32 bits in serial on one I/O line and apply those 32 bits in parallel to the DRAM 52.

The latches 220 used in the SAMs 56–62 of FIG. 7 is illustrated in FIG. 8. As explained above, each of the latches 220 is implemented by a pair of inverters 222, 224, each of which is implemented by a PMOS transistor 240, 241 having its source connected to the write enable input and its gate drain connected to the drain of a respective NMOS transistor 242, 243. The gates of the transistors 240, 242 in the inverter 222 are connected to each other, and the gates of the transistors 241, 243 in the inverter 224 are connected to each other. The input to each inverter 222, 224 is at the gate of its respective transistors 240, 242 or 241, 243, and the outputs of the inverters are at the interconnected drains of its respective transistors 240, 242 or 241, 245. As illustrated in FIG. 8, the output of the inverter 224 is connected to the input of the inverter 222, and the output of the inverter 222 is connected to the input of the inverter 224. The sources of the NMOS transistors 242, 243 are connected to ground. The sources of the PMOS transistors 240, 241 are connected to the supply voltage VCC through a PMOS transistor 246. The gate of the PMOS transistor 246 receives the write enable WE signal.

In operation, the inverters 222, 224 are powered whenever the write enable WE input is low, thereby burning on the PMOS transistor 246. At this time, a logic "0" will be applied to the input to one of the inverters through one of the transfer gates 230, 232 or 236, 238. Assume, for purposes of illustration, that a logic "0" is applied to the input 247 of the inverter 222. The logic "0" turns on the PMOS transistor 240 and turns off the NMOS transistor 242, thereby pulling the gates of the PMOS transistor 241 and the NMOS transistor 243 high to logic "1." The logic "1" applied to the gates of the PMOS transistor 241 and the NMOS transistor 243 turns off the PMOS transistor 241 and turns on the NMOS transistor 243. The output of the inverter 224 is thus driven to logic "0," thereby continuing to turn on PMOS transistor 240 and turn off NMOS transistor 242 after the logic "0" has been removed from the input 247. Thus, when a logic "0" is applied to the I/O line 247, the I/O line 248 remains at logic "1" after the logic "0" has been removed from the line 247. In a similar manner, if a logic "0" is applied to the I/O line 248 when the write enable WE input goes low, the I/O line 247 is driven to a logic "1" and remains there after the logic "0" has been removed from the I/O line 248.

Figure 9:
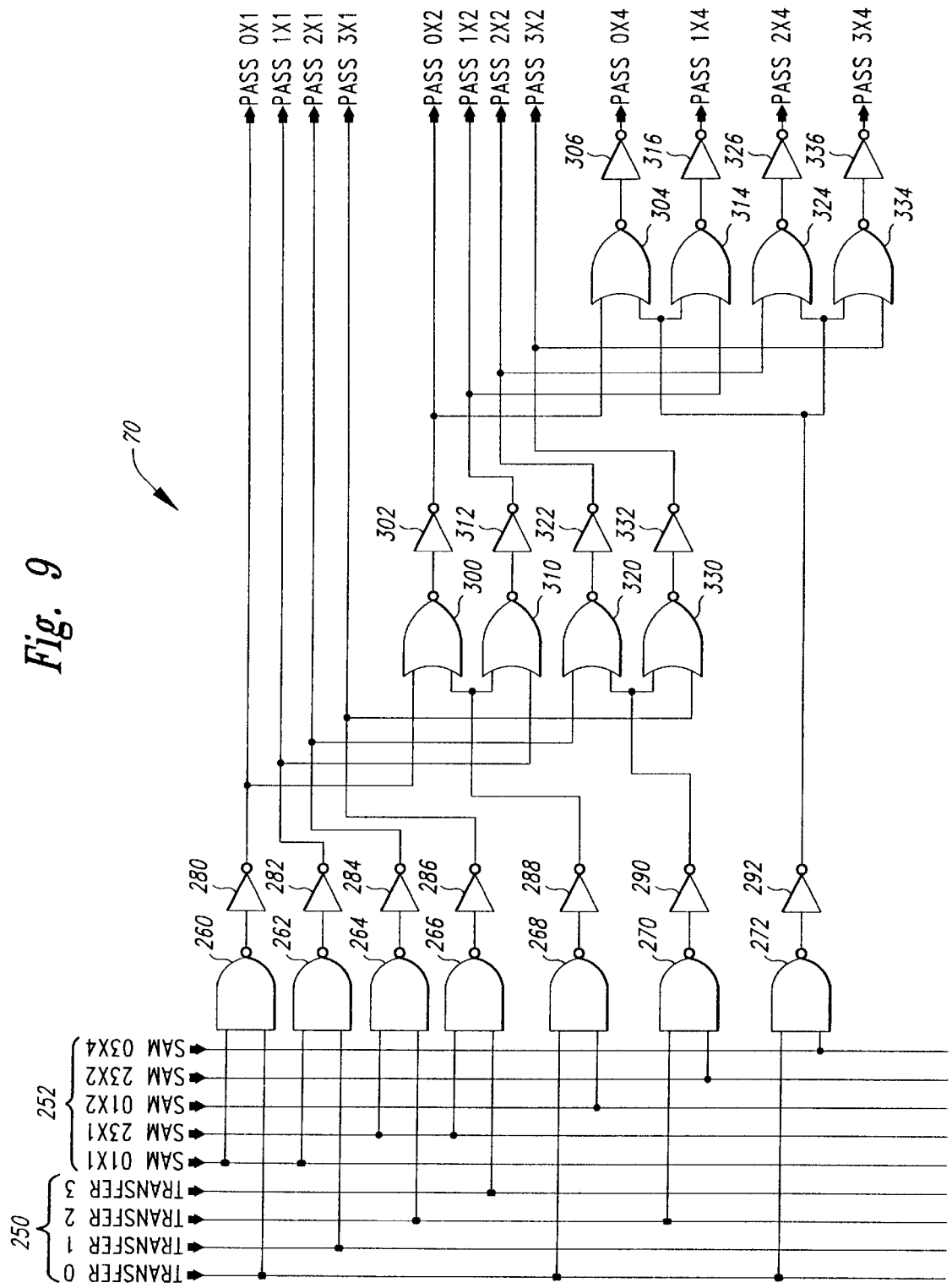
FIG. 9 is a logic diagram of a decoder circuit for controlling the transfer of data between the DRAM and serial access memories in the I/O port of FIG. 3.

The DRAM transfer circuit 70 (FIG. 3) used to generate the PASS0X1–PASS3X4 signals is illustrated in FIG. 9. The DRAM transfer circuit 70 receives a set of transfer signals 250 from the DRAM 252, and a set of programming signals PROG (FIG. 3) 252 from a suitable programming source (not shown). The programming source may be a microprocessor, a PROM, jumpers, etc., which is capable of providing one of two logic levels depending upon the desired operating mode of the serial access memories. Basically, the programming signals 252 are used to enable one or more of a series of NAND gates 260–272 so that appropriate pass signals are generated when one of the transfer signals 250 goes high. The SAM01X1 input is driven high to a logic "1" to place the serial access memories 56, 58 in a "by one" mode. As explained above, in a "by one" mode, the four bits of the DRAM 52 are transferred to the 32 cells of either the SAM 56 or the SAM 58. A logic "1" SAM01X1 enables the NAND gates 260, 262 so that either a TRANSFER0 or a TRANSFER1 signal will cause data to be transferred to or from the DRAM 50 and the SAM 56, 58, respectively. Assuming that data is to be transferred to or from the SAM 56, the TRANSFER0 input goes high to logic "1," thereby causing NAND gate 260 to output a logic "0" and an inverter 280 to output a logic "1." The logic "1" PASS0X1 enables the transfer gates between data bits 1 and 3 of the DRAM 52 and the memory cells 212, 218, respectively, of the SAM 56. The logic "1" at the output of the inverter 280 is also applied to a NOR gate 300 which is enabled by a logic "0" at the output of the inverter 288, since the SAM23X1 input applied to the NAND gate 268 is at logic "0." As a result, the NOR gate 300 outputs a logic "0" which causes an inverter 302 to output a logic "1" PASS0X2. The logic "1" PASS0X2 enables the transfer gate between the data bit 2 of the DRAM 52 and the memory cell 216 of the SAM 56. The logic "1" PASS0X2 is also applied to the input of a NOR gate 304 which is enabled by a logic "0" from the inverter 292, since SAM03X4 applied to NAND gate 272 is logic "0." As a result, NOR gate 304 outputs a logic "0" which causes an inverter 306 to output a logic "1" PASS0X4. The logic "1" PASS0X4 enables the transfer gate between data bit 0 of the DRAM 52 and the memory cell 210 of the SAM 56. Data is transferred between the remaining 28 bits of the DRAM 52 and the memory cells 190 in a similar manner that will be apparent to one skilled in the art. Thus, in the event that SAM01X1 is set to a logic "1" level, 32 bits of data are transferred between the DRAM 52 and the 32 cells of the SAM 56 when the TRANSFER0 input goes to logic "1." Alternatively, 32 bits of data are transferred between the DRAM 52 and the 32 cells of the SAM 58 whenever SAM01X1 is set at logic "1" and the TRANSFER1 input goes to logic "1." Under these circumstances, a logic "0" is generated at the output of NAND gate 262, thereby causing the inverter 282 to output a logic "1" PASS1X1. The logic "1" PASS1X1 causes a NOR gate 310 to output a logic "0," thereby causing an inverter 312 to output a logic "1" PASS1X2. The logic "1"

PASS1X2 is applied to an input of an enabled NOR gate 314, thereby causing the NOR gate 314 to output a logic "0." The logic "0" causes an inverter 316 to output a logic "1" PASS1X4.

The SAM23X1 input is set high to logic "1" to program either the SAM 60 or the SAM 62 in a "by one" mode, in substantially the same manner as the SAMs 56, 58 are programmed in a "by one" mode by the SAM01X1 input being set at logic "1." Thirty-two bits of data are transferred to or from the SAM 60 when the TRANSFER2 input goes high, thereby causing NAND gate 264 to output a logic "0" which causes inverter 284 to output a logic "1." The logic "1" PASS2X1 also causes a NOR gate 320 to output a logic "0" which, in turn, causes an inverter 322 to output a logic "1" PASS2X2. The logic "1" PASS2X2 causes an inverter 324 to output a logic "0," thereby causing an inverter 326 to output a logic "1" PASS2X4. Thus, whenever SAM23X1 is set to logic "1," PASS2X1, PASS2X2, and PASS2X4 will go high to logic "1" upon TRANSFER2 going to logic "1" to transfer 32 bits of data between the DRAM 52 and the SAM 60. In a similar manner, whenever SAM23X1 is set at logic "1" and the TRANSFER3 input goes high, the NAND gate 266 outputs a logic "0," thereby causing the inverter 286 to output a logic "1" PASS3X1. The logic "1" ASS3X1 is applied to an enabled NOR gate 330, thereby causing the NOR gate 330 to output a logic "0" to an inverter 332. The inverter 332 then outputs a logic "1" PASS3X2. The logic "1" PASS3X2 is applied to an enabled NOR gate 334, thereby causing the NOR gate 334 to output a logic "0" to an inverter 336. The inverter 336 then outputs a logic "1" PASS3X4. The logic "1" PASS3X1, PASS3X2 and PASS3X4 causes 32 bits of data to be transferred between the DRAM 52 and the SAM 62. Thus, in the "by one" mode, 32 bits of data are transferred to one of the SAMs 56–62 and, as explained in greater detail below, the data can then be clocked out serially on a pair of complementary single bit I/O port lines.

As mentioned above, the SAMs 56–62 are programmed in a "by two" mode in pairs using SAMs 56, 58 or 60, 62. SAMs 56, 58 are programmed in a "by two" mode by setting SAM01X2 to logic "1," thereby enabling NAND gate 268. When the TRANSFER2 input goes high, the NAND gate 268 outputs a logic "0" which causes the inverter 288 to output a logic "1." The logic "1" at the output of the inverter 288 is applied to both NOR gates 300, 310, thereby causing the NOR gates 300, 310 to output a logic "0" and causing the inverters 302, 312 to output logic "1" PASS0X2 and PASS1X2. The logic "1" PASS0X2 causes NOR gate 304 to output a logic "0," thereby causing the inverter 306 to output a logic "1" PASS0X4. Similarly, the logic "1" PASS1X2 causes NOR gate 314 to output a logic "0," thereby causing the inverter 316 to output a logic "1" PASS1X4. The logic "1" PASS0X2 and PASS0X4 causes data transfer between data bus bits 0 and 2 of the DRAM 52 and the memory cells 210, 216 of the SAM 56. Similarly, the logic "1" PASS1X2 and PASS1X4 allow data transfer between data bus bits 1 and 3 of the DRAM 52 and memory cells 212, 218 of the SAM 58. Data is transferred to or from the cells 190, 192 of the SAMs 56, 58, respectively, in a similar manner. Thus, whenever SAM01X2 is set at logic "1," data transfer between the DRAM 52 and the SAMs 56, 58 occurs when the TRANSFER0 input goes high.

As mentioned above, the SAMs 60, 62 can also be programmed in a "by two" mode. Programming the SAMs 60, 62 in the "by two" mode is accomplished by setting the SAM23X2 input to logic "1," thereby causing NAND gate 270 to output a logic "0" and inverter 290 to output a logic "1." The logic "1" at the output of the inverter 290 is applied to the inputs of enabled NOR gates 320, 330, thereby causing the inverters 322, 332 to output logic "1" PASS2X2 and PASS3X2. The logic "1" PASS2X2 and PASS3X2 cause NOR gates 324, 334 to output respective logic "0" signals that cause respective inverters 326, 336 to output respective logic "1" PASS2X4 and PASS3X4. As explained above with reference to FIG. 7, the logic "1" PASS2X2 and PASS2X4 allow data transfer between data bus bits 0 and 2 and memory cells 210, 216, respectively, of the SAM 60. A logic "1" PASS3X2 and PASS3X4 allow data transfer between data bus bits 1 and 3 of the DRAM 52 and the memory cells 212, 218 of the SAM 62. Data is transferred to or from the cells 194, 196 of the SAMs 60, 62, respectively, in a similar manner.

Finally, as explained above, the SAMs 56–62 may be programmed in a "by four" mode in which data grouped in 8 bits alternating by 4 bits are transferred between the DRAM 52 and the memory cells of the SAMs 56–62. The "by four" mode is programmed by setting SAM03X4 at logic "1," thereby enabling the NAND gate 272. When the TRANSFER0 input goes high, the output of the NAND gate 272 goes to logic "0," thereby causing the inverter 292 to output a logic "1." The logic "1" is then applied to the inputs of all NOR gates 304–334, thereby causing the inverters 306–336 to output respective logic "1" PASS0X4, PASS1X4, PASS2X4, and PASS3X4. These logic "1" PASSNX4 signals enable one transfer gate for each SAM 56–62, thereby allowing data transfer between the data bus of the DRAM 52 and a single memory cell of each SAM 56–62 at a time, with data being transferred in 8-bit groups alternating by 4 bits. The transfer signals TRANSFER0–TRANSFER3 are generated by conventional DRAM devices, and thus an explanation of the manner in which such signals are generated is being omitted for purposes of brevity.

Figure 10:
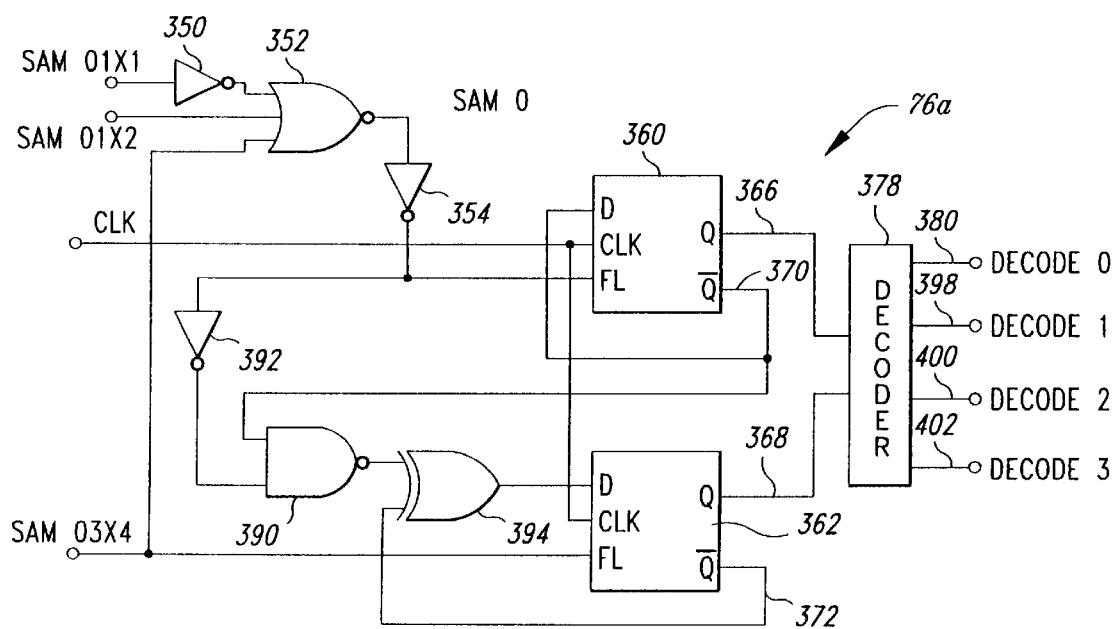
FIG. 10 is a logic diagram showing the circuitry for controlling the transfer of data between one of the serial access memories of FIG. 3 and its corresponding I/O port.

As explained above, the I/O port decoder circuit 76 (FIG. 3) generates the DECODE0-31 inputs to the transfer gates 236, 238 to allow transfer between the memory cells 210–218 and the complementary I/O port lines. The various configurations of the I/O port control circuit 76 for generating the DECODE0-3 signals are illustrated in FIGS. 10–13. The DECODE4-31 signals are generated in a similar manner by adding additional stages to the I/O port control circuits shown in FIGS. 10–13 in a manner that will be apparent to one skilled in the art. FIG. 10 shows an I/O port control circuit 76A for the SAM 56. In the SAM01X1 mode, a logic "1" is supplied to the input of an inverter 350, thereby causing the inverter 350 to output a logic "0" to a NOR gate 352. The NOR gate 352 also receives logic "0" SAM01X2 and SAM03X4 inputs so that it outputs a logic "1" which, after being inverted by an inverter 354, outputs a logic "0" to the forced low input of a D flip-flop 360, thereby causing the D flip-flop to operate in a normal manner. Similarly, since SAM03X4 is set at logic "0" in a "by one" mode, the forced low input to a D flip-flop 362 also causes it to operate in a normal manner. The flip-flops 360, 362 are connected to operate as a counter which is reset by conventional means (not shown in the interest of clarity), thereby placing the Q outputs of the flip-flops 360, 368 at logic "0" and the $\overline{Q}$ outputs 370, 372 at logic "1." Thus, both inputs to a conventional decoder 378 are at logic "0," thereby causing the decoder 378 to output a logic "1" at the DECODER0 output 380. At the same time, the logic "1" at the $\overline{Q}$ output 370 of the flip-flop 360 is applied to the D input of the flip-flop 360 so that on the next clock pulse, the flip-flop 360 changes state. Also, the logic "1" at the $\overline{Q}$ output 370 enables a NAND gate 390 which also receives a logic "1" from the output of an inverter 392. Thus, the NAND gate 390 outputs a logic "0" to an exclusive OR gate 394. However, because the exclusive OR gate 394 receives a logic "1" on output 372, it applies a logic low to the D input of the flip-flop 362. Thus, on the next clock pulse, the Q outputs of the flip-flops 360, 362 are logic "1" and logic "0," respectively. The "01" input to the decoder 378 causes the decoder 378 to output a high on its DECODE1 output 398.

At this time, since the $\overline{Q}$ output 370 of the flip-flop 360 is logic "0," the D input of the flip-flop 360 receives a logic "0," and the output of the NAND gate 390 is logic "1." Since both inputs of the exclusive OR gate 394 are now logic "1," the exclusive OR gate 394 outputs a logic "1" to the D input of the flip-flop 362. Thus, on the next leading edge of the clock, the outputs of the flip-flops 360, 362 increment to the two count, i.e., "10." This "10" output is decoded by the decoder 378 to output a logic "1" at its DECODE2 output 400. When the flip-flops 362, 360 are outputting a "10" count, the $\overline{Q}$ output 370 of the flip-flop 360 is at logic "1," thereby applying a logic "1" to the D input of the flip-flop 360. At this time, both inputs of the exclusive OR gate 394 are at logic "0," so that the exclusive OR gate 394 applies a logic "1" to the D input of the flip-flop 362. Thus, on the next leading edge of the clock, the Q outputs of the flip-flops 362, 360 output a 3 count, i.e., "11." This 3 count is decoded by the decoder 378 to cause the decoder 378 to output a logic "1" on the DECODE3 output 402.

At the "11" count of the flip-flops 362, 360, the D input of the flip-flop 360 is at logic 0, thereby causing the output of the NAND gate 390 to be at logic "1." However, since the $\overline{Q}$ output 372 of the flip-flop 362 is at logic "0," the output of the exclusive OR gate 394 applied to the D input of the flip-flop 362 is at logic "0." Thus, on the next leading edge of the clock, the count generated by the flip-flops 362, 360 returns to "00," thereby causing the decoder 378 to output a logic "1" on the DECODE0 output 380. Thus, in the SAM01X1 mode, the decoder outputs 380, 398, 400, 402 sequentially output a logic "1" which, as explained above with reference to FIG. 7, cause each of the cells 210–218 of the SAM 56 to sequentially apply or receive complementary signals on its I/O port lines.

When the serial access memory 200 is programmed in the "by two" mode, the SAM01X2 input is set to logic "1," as explained above. Accordingly, the output of the NOR gate 352 is at logic "0," thereby causing the inverter 354 to output a logic "1" to the forced low input of the flip-flop 360. The flip-flop 360, then continuously generates a logic "0" out of its Q output 366. Furthermore, the logic "1" applied to the forced low input of the flip-flop 360, after being inverted by the inverter 392, disables the NAND gate 390 so that the NAND gate 390 continuously applies a logic "0" to the exclusive OR gate 394. On the first clock pulse, the flip-flops 362, 360 output a 0 count, i.e., "00." Under these circumstances, the $\overline{Q}$ output 372 of the flip-flop 362 is at logic "1" so that both inputs of the exclusive OR gate 394 are a logic "1." As a result, a logic "1" is applied to the D input of the flip-flop 362 so that on the next clock pulse, the flip-flops 362, 360 assume the 2 count, i.e., "10." As a result, the decoder 378 outputs a logic "1" on the DECODE2 output 400. At this time, the $\overline{Q}$ output 372 of the flip-flop 362 is at logic "0" so that the exclusive OR gate 394 applies a logic "0" to the D input of the flip-flop 362. Thus, on the next leading edge of the clock pulse, the flip-flops 362, 360 return to the 0 count, i.e., "00," thereby causing the decoder 378 to output a logic "1" on the DECODE0 output 380. Thus, in the "by two" mode programmed by setting SAM01X2 to logic "1," the cells 210, 216 are alternately connected to the complementary I/O port lines of the SAM 56.

The "by four" mode is programmed by setting the SAM03X4 line to logic "1," thereby applying a logic "1" to the forced low input of the flip-flop 362. The logic "1" SAM03X4 also causes the NOR gate 352 to output a logic "0" which, after being inverted by inverter 354, applies a logic "1" to the forced low input of the flip-flop 360. Thus, in the "by four" mode in which SAM03X4 is set at logic "1," the flip-flops 362, 360 continuously output a 0 count, i.e., "00," thereby causing the decoder 378 to continuously drive the DECODE0 output 380 to logic "1." As a result, the cell 210 of the SAM 56 is continuously connected to its complementary I/O port lines.

As mentioned above, the I/O port controller 76 can be augmented to generate DECODE4-12 signals by adding additional circuitry to the circuitry shown in FIG. 10 in a manner that will be apparent to one skilled in the art. Specifically, 3 additional flip-flops (not shown) are added to the flip-flops 360, 362 to generate 5 outputs to the decoder 378. The decoder then generates $2^5$, i.e., 32 outputs (0–31) from the 5 inputs from the flip-flops.

Figure 11:
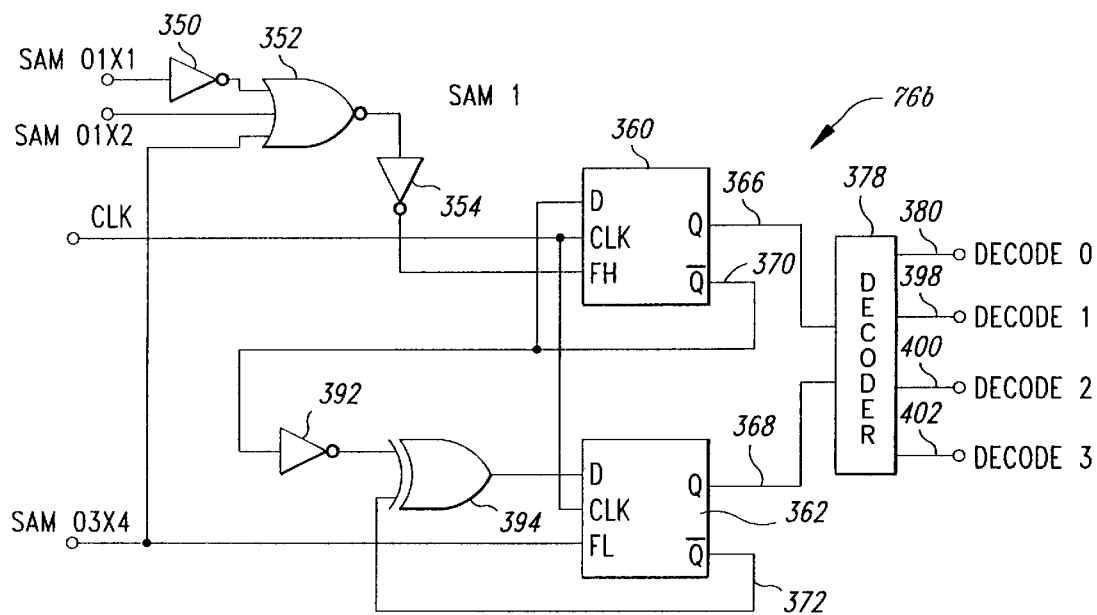
FIG. 11 is a logic diagram showing the circuitry for controlling the transfer of data from another of the serial access memories of FIG. 3 in its corresponding I/O port.

The I/O port controller 76 for the SAM 58 is illustrated in FIG. 11. The I/O port controller 76B for the SAM 58 is similar in construction and operation to the I/O port controller 76A for the SAM 56, except for relatively minor differences which alter its operation slightly. Therefore, corresponding components have identical reference numerals, and a detailed explanation is omitted for the purposes of brevity. Basically, the I/O port controller 76B of FIG. 11 omits the NAND gate 390 so that the $\overline{Q}$ output 370 of the flip-flop 360 is connected directly to the input of the exclusive OR gate 394 through the inverter 392. In operation in the "by one" mode, the flip-flops 362, 360 initially output a 0 count, i.e., "00," thereby causing the decoder 378 to output a logic "1" on its DECODE0 output 380. Under these circumstances, the D input of the flip-flop 360 receives a logic "1," the inverter 392 outputs a logic "0" to one input of the exclusive OR gate 394, and the $\overline{Q}$ output 372 of the flip-flop 362 outputs a logic "1" to the other input of the exclusive OR gate 394. The exclusive OR gate 394 then applies a logic "0" to the D input of the flip-flop 362. On the next leading edge of the clock, the flip-flops 362, 360 assume the 1 count, i.e., "01," thereby causing the decoder 378 to output a logic "1" on its DECODE1 output 398. Under these circumstances, the D input of the flip-flop 360 is at logic "0," thereby causing both inputs of the exclusive OR gate 394 to be at logic "1." On the next leading edge of the clock, the flip-flops 362, 360 assume the 2 count, i.e., "10," thereby causing the decoder 378 to output a logic "1" on its DECODE2 output 400. Under these circumstances, the $\overline{Q}$ output 370 of the flip-flop 360 applies a logic "1" to the D input of the flip-flop 360, and both inputs of the exclusive OR gate 394 are at logic "0." Thus, both flip-flops 360, 362 receive a logic "1" at their respective D inputs. Accordingly, on the next leading edge of the clock, the flip-flops 362, 360 assume the 3 count, i.e., "11," thereby causing the decoder 378 to output a logic "1" on its DECODE3 output 402. Under these circumstances, the $\overline{Q}$ output 370 of the flip-flop 360 applies a logic "0" to the D input of the flip-flop 360, and the inverter 392 applies a logic "1" to one input of the exclusive OR gate 394. The other input of the exclusive OR gate 394 receives a logic "0" from the $\overline{Q}$ output 372 of the flip-flop 362, thereby causing the exclusive OR gate 394 to output a logic "0" to the D input of the flip-flop 362. Thus, both of the flip-flops 360, 362 receive a logic "0" at their respective D inputs. Accordingly, on the next leading edge of the clock, the flip-flops 362, 360 return to their 0 count, i.e., "00," thereby causing the decoder 378 to output a logic "1" on its DECODE0 output 380. Thus, in the "by one" mode, the I/O port controller 76B operates in the same manner as the I/O port controller 76A to sequentially apply each of the cells 210–218 to its complementary I/O port lines.

In the "by two" mode, the SAM01X2 input is set to logic "1," thereby causing the NOR gate 352 to output a logic "0" which, after being inverted by the inverter 354, applies a logic "1" to the forced high input of the flip-flop 360. The flip-flop 360 thus continuously outputs a logic "1" at its Q output 366 and a logic "0" at its $\overline{Q}$ output 370. The inverter 392 thus continuously outputs a logic "1" to the exclusive OR gate 394. It will be recalled that, in the "by two" mode, the NAND gate 390 (FIG. 10) continuously applied a logic "1" to the exclusive OR gate 394. It will further be recalled that the logic "1" continuously applied to the exclusive OR gate 394 caused the Q output 368 of the flip-flop 362 to toggle between 0 and 1 each clock pulse. Since the exclusive OR gate 394 in the I/O port controller 76 also continuously receives a logic "1," it causes the flip-flop 362 to operate in the same manner, i.e., alternately toggling between logic "0" and logic "1" each clock pulse. Thus, the counters 362, 360 alternate between a 1 count, i.e., "01," and a 3 count, i.e., "11," to cause the decoder 378 to alternately apply a logic "1" to its DECODE1 output 398 and its DECODE3 output 402. The logic "1" alternately applied between these two outputs cause the cells 212, 218 of the SAM 58 (FIG. 7) to be alternately applied to the complementary I/O port lines.

Finally, in the "by four" mode, the SAM03X4 input is set to logic "1" to apply a logic "1" to the forced low input of the flip-flop 362. The logic "1" SAM03X4 input also causes the NOR gate 352 to output a logic "0," thereby causing the inverter 354 to continuously apply a logic "1" to the forced high input of the flip-flop 360. Thus, the flip-flops 362, 360 continuously output a 1 count, i.e., "01," thereby causing the decoder 378 to continuously apply a logic "1" to its DECODE1 output 398. This logic "1" output causes the cell 212 of the SAM 58 to be continuously applied to its complementary I/O port lines.

Figure 12:
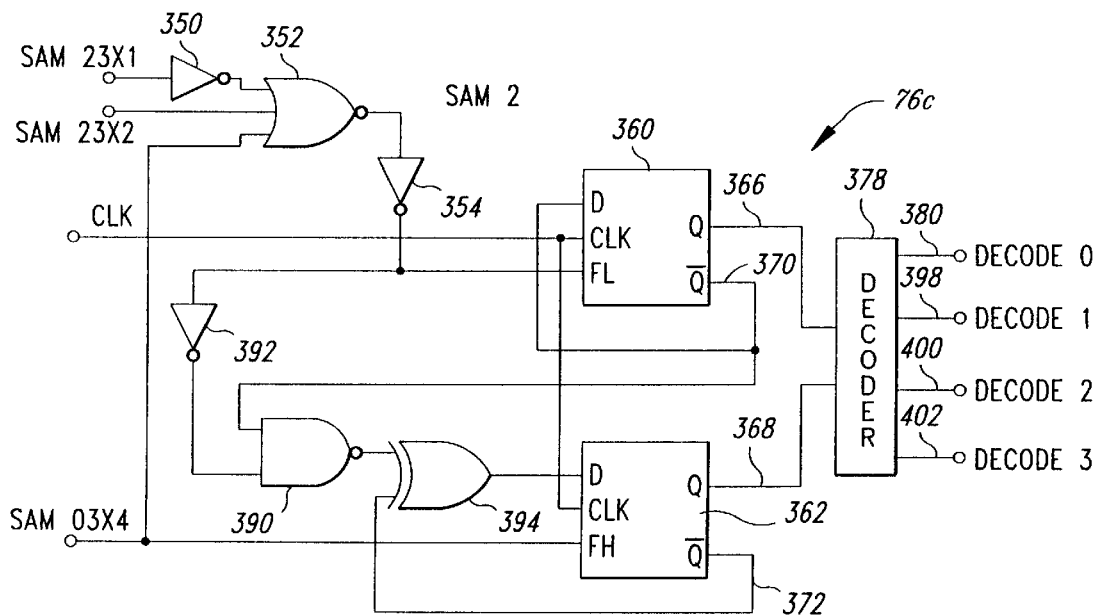
FIG. 12 is a logic diagram showing the circuitry for controlling the transfer of data from another of the serial access memories of FIG. 3 in its corresponding I/O port.

The I/O port controller 76C for the SAM 60 is illustrated in FIG. 12. The I/O port controller 76C is identical to the I/O port controller 76A for the SAM 56, and its circuitry has thus been provided with the same reference numerals. Also, in the interest of brevity, its operation will not be separately explained in detail. The I/O port controller 76C of FIG. 12 differs from the I/O port controller 76A of FIG. 10 only in that the SAM03X4 input is connected to the forced high input of the flip-flop 362 rather than the forced low input of the flip-flop 362, as in FIG. 10. Thus, the decoder 378 of the I/O port controller 76C sequentially outputs a logic "1" at the decode outputs 380–402 in the "by one" mode programmed by setting SAM23X1 at logic "1." Similarly, the decoder 378 alternately outputs a logic "1" on its DECODE0 output 380 and its DECODE2 output 400 in the "by two" mode programmed by setting the SAM23X2 input to logic "1." However, in the "by four" mode, since the SAM03X4 input is applied to the forced high input of the flip-flop 362, the flip-flops 362, 360 continuously assume the 2 count, i.e., "10," thereby causing the decoder 378 to continuously output a logic "1" on the DECODE2 output 400.

Figure 13:
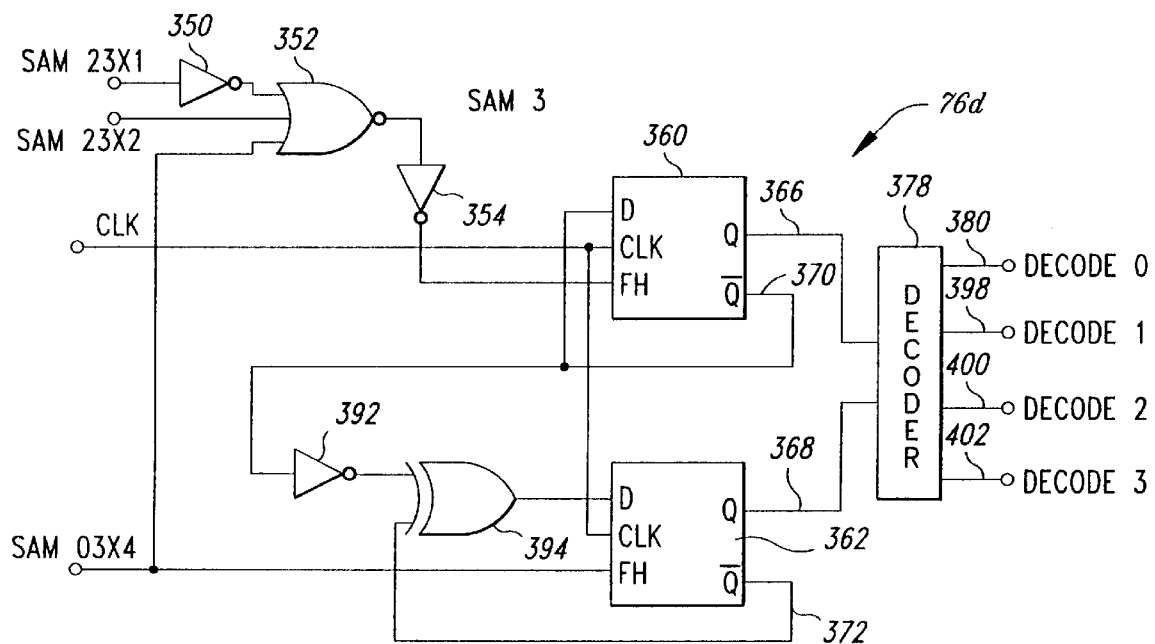
FIG. 13 is a logic diagram showing the circuitry for controlling the transfer of data from another of the serial access memories of FIG. 3 in its corresponding I/O port.

The I/O port controller 76D for the SAM 62 is illustrated in FIG. 13. The I/O port controller 76D is identical to the I/O port controller 76B shown in FIG. 11, except that the SAM03X4 input is applied to the forced high input of the flip-flop 362 rather than the forced low input, as in FIG. 11.

Thus, the I/O port controller 76D operates in the same manner as the I/O port controller 76B in the "by one" and "by two" modes. However, in the "by four" mode programmed by setting the SAM03X4 input to logic "1," the counters 362, 360 continuously output a 3 count, i.e., "11," thereby causing the decoder 378 to continuously output a logic "1" on the DECODE3 output 402.

Figure 14:
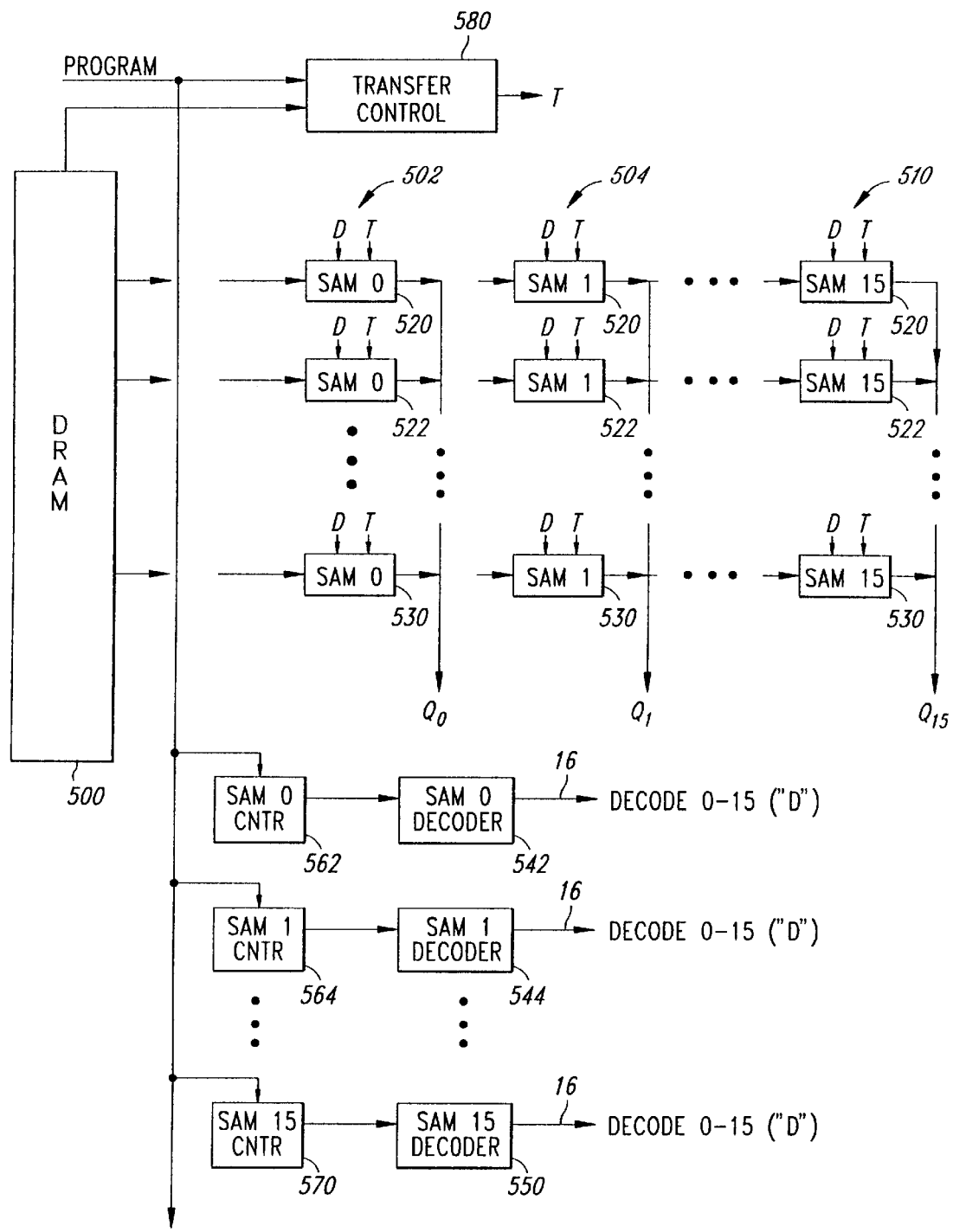
FIG. 14 is a block diagram showing a communications interface for controlling the transfer of data through 16 bits that are arranged in various bus configurations.

The communications interface shown in FIGS. 7–13 is adapted to transfer 32 bits of data between the DRAM 52 and four SAMs 56–62. However, the inventive I/O port can be generalized to an I/O port that can be programmed to any bandwidth and configuration. For example, a serial port is illustrated in FIG. 14 in which a DRAM 500 having a 16-bit data bus interfaces with 16 sets of SAMs 502, 504 . . . 510 according to transfer signals "T" generated by a transfer controller 580. The SAMs 502–510 each consists of 16 serial access cells 520, 522 . . . 530. Each of the SAMs 502, 504 . . . 510 receives decode signals from a respective decoder 542, 544 . . . 550 which, in turn, receive appropriate signals from a respective controller circuit 562, 564 . . . 570. Finally, data transferred between the DRAM 500 and each of the SAMs 502 is controlled by a transfer control circuit 580.

The 16-bit serial port of FIG. 14 operates in substantially the same manner as the embodiment shown in FIGS. 7–13. In a "by one" mode, 16 bits of data is transferred in parallel from the DRAM 500 to the 16 cells of any one of the SAMs 502, 504 . . . 510 by the respective controller circuit 562–570. The decoder circuit 542–550 corresponding to the serial access memory 502–510 then sequentially outputs a control signal on each of its 15 outputs to cause the 16 cells of the SAMs 502–510 to be sequentially connected to the I/O port line Q0, Q1 . . . Q15. In the "by two" mode, the SAMs 502–510 are used in pairs with data being transferred between the DRAM 500 and the memory cells of the SAMs 502–510 in the pair in alternating fashion. Thus, for example, if SAMs 502, 504 are used in a "by two" mode transfer, data is transferred between the DRAM 500 and the even memory cells of the SAM 502, and data is transferred between the DRAM 500 and the odd memory cells of the SAM 504. The serial port shown in FIG. 14 can also operate in a "by four" mode in which four SAMs are used as explained above with reference to FIGS. 7–13. In a similar manner, the serial port may be programmed in a "by eight" mode in which eight SAMs are used together to output two, 8-bit words on a 8-bit bus. Finally, in a "by 16" mode, a respective cell in each SAM 502–510 receives a single bit of data from the DRAM 500, and the data is transferred from the SAMs 502–510 on all 16 I/O port lines Q0–Q15 at the same time.

The controller circuits 562–570 and decoder circuits 540–550 can be easily implemented by one skilled in the art to provide these data transfers. Basically, the decoders 542–550 are simply a binary to decimal decoder, and the transfer control circuits 562–570 are implemented with simple counter circuits using flip-flops having appropriate forced high and forced low inputs programmed by the program signals. The transfer controller 580 can be easily implemented in a manner similar to FIG. 9.

It is thus seen that the inventive serial memory allows great flexibility in the transfer of data between a DRAM 500 and I/O ports of varying bandwidth.

We claim:

1. A communications interface having a plurality of I/O ports each of which has a programmable bandwidth for allowing asynchronous data transfer through said plurality of ports, said communications interface comprising:

a random access memory having a data bus containing a predetermined number of bits;

a plurality of serial access memories each of which has a plurality of memory cells, the corresponding memory cells of each serial access memory being connected to a respective bit of said random access memory data bus to allow data transfer between said random access memory and the memory of cells of said serial access memory responsive to respective transfer signals, the memory cells in groups of one or more of said serial access memories being selectively connected to respective of said I/O ports responsive to negative sequence signals;

a random access memory transfer circuit providing said transfer signals as a function of the programming of said I/O port so that data is transferred between said random access memory and selected memory cells of selected serial access memories as a function of said programming, said random access memory transfer circuit comprising:
- a transfer enable signal generator included in said random access memory, said transfer enable signal generator generating transfer enable signals corresponding to each of said serial access memories;
- a program generator providing programming signals designating each serial access memory to be used with a respective I/O port and the bandwidth of such I/O port; and
- a logic circuit receiving said transfer enable signals and said programming signals, said logic circuit generating said transfer signals as a predetermined function of said transfer enable signals and said programming signals, said transfer signals transferring data between said random access memory and at least one serial access memories when a transfer enable signal corresponding to said serial access memory is generated and a programming signal corresponding to an I/O port connected to said serial access memory is generated; and a sequencer providing said sequence signals as a function of said programming so that data is transferred between said I/O ports and selected memory cells of selected serial access memories as a function of said programming.

2. A communications interface having a plurality of I/O ports each of which has a programmable bandwidth for allowing asynchronous data transfer through said plurality of ports, said communications interface comprising:

a random access memory having a data bus containing a predetermined number of bits;

a plurality of serial access memories each of which has a plurality of memory cells, the corresponding memory cells of each serial access memory being connected to a respective bit of said random access memory data bus to allow data transfer between said random access memory and the memory of cells of said serial access memory responsive to respective transfer signals, the memory cells in groups of one or more of said serial access memories being selectively connected to respective of said I/O ports responsive to negative sequence signals;

a random access memory transfer circuit providing said transfer signals as a function of the programming of said I/O port so that data is transferred between said random access memory and selected memory cells of selected serial access memories as a function of said programming; and a sequencer providing said sequence signals as a function of said programming so that data is transferred between said I/O ports and selected memory cells of selected serial access memories as a function of said programming, said sequencer comprising:
- a program generator providing programming signals designating each serial access memory to be used with a respective I/O port and the bandwidth of such I/O port and the bandwidth of such I/O port;
- a counter circuit for each of said serial access memories, said counter circuits receiving said programming signals and generating a binary output incrementing in a pattern corresponding to the order in which the memory cells of said serial access memory are to communicate with said I/O port, the increment pattern being designated by said programming signals; and
- a binary decoder having a plurality of outputs corresponding in number to the memory cells of said serial access memory said decoder receiving the binary output of said counter circuit and generating at its output said sequence signals.

3. The communications interface of claim 2 wherein said counter circuit includes a plurality of flip-flops connected to each other to implement a counter, and wherein said programming signals are applied to respective force inputs of said counters to selectively force the outputs of said counters to predetermined values depending upon the state of said programming signals.

4. A multiple port communications interface for allowing asynchronous communications between a first communications port and a plurality of second communication ports, comprising:

a random access memory having a data bus containing a predetermined number of bits;

a first plurality of serial access memories each of which has a plurality of memory cells communicating with a respective bit of said random access memory data bus to allow data transfer between said random access memory and the memory cells of said serial access memory responsive to respective transfer signals, the memory cells in groups of one or more of said serial access memories being selectively connected to said first communications port for allowing data transfer between said first communications port and said first plurality of serial access memories responsive to respective sequence signals;

a second plurality of serial access memories each of which has a plurality of memory cells communicating with said data bus to allow data transfer between said random access memory and the memory cells of said serial access memory responsive to respective transfer signals, the memory cells in groups of one or more of said serial access memories being selectively connected to respective second communications ports for allowing data transfer between said second communications ports and said serial access memories responsive to respective sequence signals;

a random access memory transfer circuit providing said transfer signals as a function of the bandwidth of each of said communications ports and, said random access memory transfer circuit comprising:
- a transfer enable signal generator included in said random access memory, said transfer enable signal generator generating transfer enable signals corresponding to each of said serial access memories;

a program generator providing programming signals designating each serial access memory to be used with a respective I/O port and the bandwidth of such I/O port; and a logic circuit receiving said transfer enable signals and said programming signals, said logic circuit generating said transfer signals as a predetermined function of said transfer enable signals and said programming signals, said transfer signals transferring data between said random access memory and at least one serial access memories when a transfer enable signal corresponding to said serial access memory is generated and a programming signal corresponding to an I/O port connected to said serial access memory is generated; and a sequencer providing said sequence signals as a function of the bandwidth of each of said communications ports.

5. A multiple port communications interface for allowing asynchronous communications between a first communications port and a plurality of second communication ports, comprising:

a random access memory having a data bus containing a predetermined number of bits;

a first plurality of serial access memories each of which has a plurality of memory cells communicating with a respective bit of said random access memory data bus to allow data transfer between said random access memory and the memory cells of said serial access memory responsive to respective transfer signals the memory cells in groups of one or more of said serial access memories being selectively connected to said first communications port for allowing data transfer between said first communications port and said first plurality of serial access memories responsive to respective sequence signals;

a second plurality of serial access memories each of which has a plurality of memory cells communicating with said data bus to allow data transfer between said random access memory and the memory cells of said serial access memory responsive to respective transfer signals the memory cells in groups of one or more of said serial access memories being selectively connected to respective second communications ports for allowing data transfer between said second communications ports and said serial access memories responsive to respective sequence signals;

a random access memory transfer circuit providing said transfer signals as a function of the bandwidth of each of said communications ports; and a sequencer providing said sequence signals as a function of the bandwidth of each of said communications ports, said sequencer comprising:

a program generator providing programming signals designating each serial access memory to be used with a respective I/O port and the bandwidth of such I/O port;

a counter circuit for each of said serial access memories, said counter circuits receiving said programming signals and generating a binary output incrementing in a pattern corresponding to the order in which the memory cells of said serial access memory are to communicate with said I/O port, the increment pattern being designated by said programming signals; and a binary decoder having a plurality of outputs corresponding in number to the memory cells of said serial access memory, said decoder receiving the binary output of said counter circuit and generating at its output said sequence signals.

6. A variable bandwidth I/O port, comprising:

a random access memory having a data bus containing a predetermined number of bits;

a plurality of serial access memories each of which has a plurality of memory cells, the corresponding memory cells of each serial access memory being connected to a respective bit of said random access memory data bus to allow data transfer between said random access memory and the memory cells of said serial access memory responsive to respective transfer signals, the memory cells in groups of one or more of said serial access memories being selectively connected to respective I/O port lines of said I/O port responsive to respective sequence signals;

a random access memory transfer circuit providing said transfer signals as a function of the programming of said I/O port so that data is transferred between said random access memory and selected memory cells of selected serial access memories as a function of said programming, said random access memory transfer circuit comprising:

a transfer enable signal generator included in said random access memory, said transfer enable signal generator generating transfer enable signals corresponding to each of said serial access memories;

a program generator providing programming signals designating each serial access memory to be used with a respective I/O port and the bandwidth of such I/O port; and a logic circuit receiving said transfer enable signals and said programming signals, said logic circuit generating said transfer signals as a predetermined function of said transfer enable signals and said programming signals, said transfer signals transferring data between said random access memory and at least one serial access memories when a transfer enable signal corresponding to said serial access memory is generated and a programming signal corresponding to an I/O port connected to said serial access memory is generated; and a sequencer providing said sequence signals as a function of said programming so that data is transferred between selected memory cells of selected serial access memories and respective number of lines of said I/O port corresponding to said programming.

7. A variable bandwidth I/O port, comprising:

a random access memory having a data bus containing a predetermined number of bits;

a plurality of serial access memories each of which has a plurality of memory cells, the corresponding memory cells of each serial access memory being connected to a respective bit of said random access memory data bus to allow data transfer between said random access memory and the memory cells of said serial access memory responsive to respective transfer signals, the memory cells in groups of one or more of said serial access memories being selectively connected to respective I/O port lines of said I/O port responsive to respective sequence signals;

a random access memory transfer circuit providing said transfer signals as a function of the programming of said I/O port so that data is transferred between said random access memory and selected memory cells of selected serial access memories as a function of said programming; and a sequencer providing said sequence signals as a function of said programming so that data is transferred between selected memory cells of selected serial access memories and respective number of lines of said I/O port corresponding to said programming, said sequencer comprising:

a program generator providing programming signals designating each serial access memory to be used with a respective I/O port and the bandwidth of such I/O port;

a counter circuit for each of said serial access memories, said counter circuits receiving said programming signals and generating a binary output incrementing in a pattern corresponding to the order in which the memory cells of said serial access memory are to communicate with said I/O port, the increment pattern being designated by said programming signals; and a binary decoder having a plurality of outputs corresponding in number to the memory cells of said serial access memory, said decoder receiving the binary output of said counter circuit and generating at its output said sequence signals.

* * * * *